United States Patent [19]
Tamer

[11] Patent Number: 5,943,689
[45] Date of Patent: Aug. 24, 1999

[54] ON-DEMAND INITIALIZATION OF MEMORY LOCATIONS AS THEY ARE REQUESTED COMMAND

[75] Inventor: Philip Tamer, Framingham, Mass.

[73] Assignee: EMC Corporation, Hopkinton, Mass.

[21] Appl. No.: 08/831,503

[22] Filed: Mar. 31, 1997

[51] Int. Cl.[6] .................................................. G06F 13/14
[52] U.S. Cl. ........................................................ 711/166
[58] Field of Search .................................. 711/166, 206, 711/4

[56] References Cited

U.S. PATENT DOCUMENTS

| | | | |
|---|---|---|---|
| 4,247,905 | 1/1981 | Yoshida et al. | 711/166 |
| 4,831,513 | 5/1989 | Kanazawa | 711/166 |
| 5,007,001 | 4/1991 | Lloyd-Williams | 345/428 |
| 5,206,939 | 4/1993 | Yanai et al. | 711/4 |
| 5,313,611 | 5/1994 | Franklin et al. | 711/206 |
| 5,365,451 | 11/1994 | Wang et al. | 701/213 |
| 5,381,539 | 1/1995 | Yanai et al. | 711/133 |
| 5,680,640 | 10/1997 | Ofek et al. | 395/839 |

*Primary Examiner*—John W. Cabeca
*Assistant Examiner*—Felix B. Lee
*Attorney, Agent, or Firm*—Fish & Richardson P.C.

[57] ABSTRACT

An on demand method of initializing a data storage medium, the method including the steps of: specifying a region of the data storage medium that is to be initialized in preparation for storing data in that region; setting up a table for keeping track of which portions of the region have been initialized; in response to receiving a request for accessing a specified location within the region, checking the table to determine whether the location to which access is being requested had been previously initialized; if the table indicates that the specified location has not been previously initialized, initializing that specified location within the data storage medium; and updating the table to indicate that the specified location within the data storage medium has been initialized.

8 Claims, 2 Drawing Sheets

ON-DEMAND INITIALIZATION OF MEMORY LOCATIONS AS THEY ARE REQUESTED COMMAND

BACKGROUND OF THE INVENTION

The invention relates generally to initializing data storage prior to its use for storing data.

In commercially available database software today, when a user creates a database for the first time, all of the devices that are assigned to the database are first initialized. This means that a zero (or some other predefined character or pattern of characters) is written to the data storage locations in the address space that is to be used for the database. Initialization is performed to make sure that there is no dirty data in the system that might later be mistakenly treated as real data. That is, it is a way of making sure that every read is of real data and not meaningless data.

Typically, the initialization operation is done serially for each device and in the large data storage systems that are available today, it can take hours to complete. For example, a data storage system such as the Symmetrix Model 3XXX series integrated cache disk arrays from EMC Corporation of Hopkinton, Mass., can have over one hundred disk devices within a single box. And each device can hold more than 10 gigabytes of data. Thus, initializing a single device can take over 10 minutes. And since the process is performed serially, initializing the entire box can take almost a day. That can represent a very large inconvenience to the user.

SUMMARY OF THE INTENTION

In general, in one aspect, the invention is a new command that is supported by the data storage system to which a host processor connects. The new command, referred to as an on-demand initialization command, defines a region of the data storage that is to be used for subsequent database storage. Rather than initializing this region of data storage, the data storage system initializes it on demand. That is, the data storage system initializes portions of the region when they are first accessed by the database application running on the host processor.

In general, in another aspect, the invention is an on demand method of initializing a data storage medium. The method includes the steps of specifying a region of the data storage medium that is to be initialized in preparation for storing data in that region; setting up a table for keeping track of which portions of the region have been initialized; in response to receiving a request for accessing a specified location within the region, checking the table to determine whether the location to which access is being requested had been previously initialized; if the table indicates that the specified location has not been previously initialized, initializing that specified location within the data storage medium; and updating the table to indicate that the specified location within the data storage medium has been initialized.

Preferred embodiments include the following features. The method further includes the step of performing the access requested by the access request. Also, the method includes the steps of: if the table indicates that the specified location has been previously initialized, performing the access requested by the access request without performing any further initialization.

In general, in still another aspect, the invention is a data storage system that provides data storage for a host processor. The data storage system includes a data storage medium; and a controller programmed to carry out the following steps: in response to receiving an on-demand initialization command specifying a region of the data storage medium that is to be initialized in preparation for the host processor storing data in that region, setting up a table for keeping track of which portions of the region have been initialized; in response to receiving a request from the host processor for accessing a specified location within the region, checking the table to determine whether the location to which access is being requested had been previously initialized; if the table indicates that the specified location has not been previously initialized, initializing that specified location within the data storage medium; and updating the table to indicate that the specified location within the data storage medium has been initialized.

The new command spreads out the initialization task over time so that it is done transparently and without noticeable impact on system performance.

Other advantages and features will become apparent from the following description of the preferred embodiment and from the claims.

DESCRIPTION OF THE PREFERRED EMBODIMENTS

Figure 1:
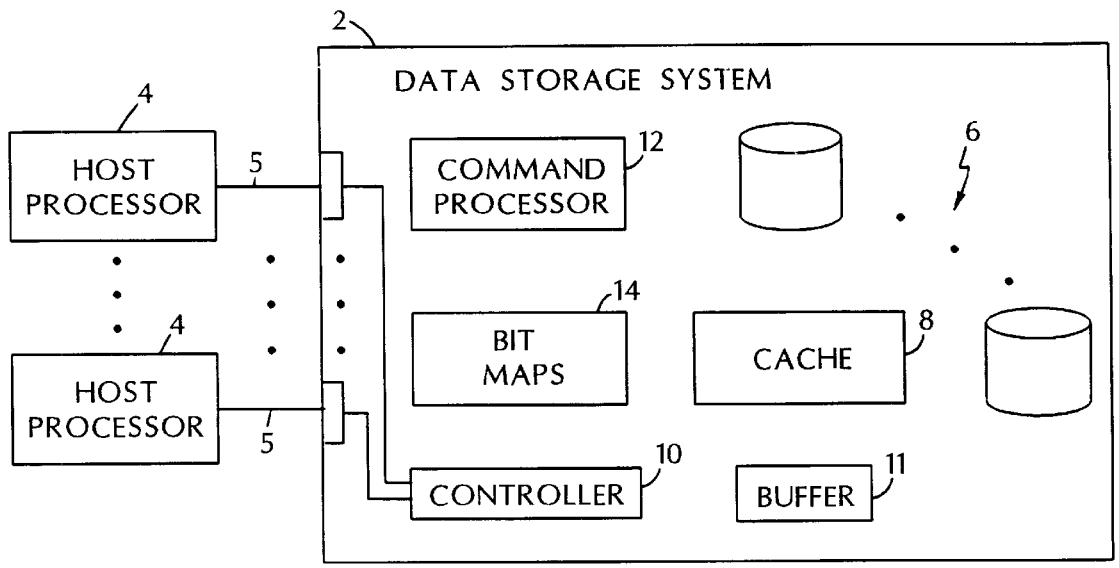
FIG. 1 is a block diagram of a data storage system that implements an on-demand initialization command.

Referring to FIG. 1, a typical system in which the invention can be implemented includes a data storage system 2 to which one or more host processors 4 are connected via a corresponding one or more connections 5. The data storage system might be the Symmetrix Model 3XXX series product mentioned above or it could be any other commercially available system such as might be used for online storage.

The relevant elements of data storage system 2 include an array of disks 6, a cache memory 8, and a controller 10. Disk array 6 provides the permanent storage within the data storage system and is typically configured into a set of logical volumes or devices, where each logical volume might be equal in size to a single physical disk in the disk array or a portion of a disk. Cache memory 8 provides temporary storage for the data on which the host processor is performing its read/write operations. The cache memory is divided into cache slots each of which holds a logical volume of data from the disk array. Controller 10 coordinates the internal operation of the data storage system, including the transfer of data between the cache and the disk array. More specifically, controller 10 provides an interface through which the host processor(s) communicate with the data storage unit. It also controls the staging of data from the disk array to cache memory in preparation for access by the host processor(s) and the destaging of data from cache memory to the disk array, when that data is no longer needed. In other words, when the host processor requests access to data in a specified location of the address space, the controller checks whether that data is already in the cache. If the data is not already in cache, the controller makes room in the cache by destaging unused data back to the disk array and then moving the relevant data into cache memory. In the described embodiment, data is moved between cache and the disk array in units that are equal to 32 Kbytes.

The design and operation of these internal elements are known to persons skilled in the art. Since their design is not of central importance to the present invention, further details will not be provided here. Instead, the reader is referred to other publicly available resources for such information, including, for example, U.S. Pat. No. 5,381,539 and U.S. Pat. No. 5,206,939, both of which are owned by EMC Corporation and are incorporated herein by reference.

In the described embodiment, the smallest unit of data that can be addressed or moved is a block, which has a fixed size of 512 bytes. It should be understood, however, that blocks could be of a different size and could even be of a variable size.

An element of the data storage system that is particularly relevant to the present invention is a command processor 12 which processes and implements the commands that are sent to the data storage system by the host processor(s). In the present embodiment, the command processor, which might be implemented in part by microcode within the controller, supports a set of three on-demand initialization commands, namely, F_init_open[ ], F_init[ ], and F_init_close[ ], which are issued to it by the host processor and which instruct the data storage system to perform a "fuzzy" initialization.

The F_init_open command, which is sent to the data storage system to start the initialization process, requires that at least three parameters be specified, namely: device_name, which specifies the name of the device that is to be initialized; min_block_size which specifies the minimum size of the block that will be read by the application; and init_pattern which specifies the initialization character or pattern that is to be written to the device when it is initialized.

In the described embodiment, the application sets the granularity level, i.e., the minimum size of the unit of storage that is to be initialized on demand. Typically, database applications define the minimum amount of storage that it will read. In some database applications, such as those sold by Sybase, Inc., the size of the minimum read is fixed, e.g., to 1 page which equals four blocks where a block is 512 bytes. In other database applications, such as those from Oracle Corp., the minimum read size is setable from 4 block to 64 blocks. In any event, the minimum block size that is used by the application establishes the minimum size of the unit of data storage that is to be initialized on demand.

Also in the described embodiment, the init_pattern parameter identifies a buffer 11 (see FIG. 1) in the data storage system and in which the application stores the particular initialization pattern which is to be used. As noted earlier, an application can specify an initialization character that is more complex than simply writing a zero or a one to each storage location. It can also specify a more complex pattern of characters. Buffer 11 stores whatever initialization pattern the application selects and the application passes the location of this buffer to the data storage system using the init_pattern parameter in the F_init_open command.

In response to receiving the F_init_open command, the data storage system will return a unique handle which identifies the device that has been opened for the application. The application then uses that handle to identify the device that is being set up for on demand initialization.

After the handle is obtained, the application issues the F_init[handle, Addr-S, Addr-E] command. In this command, the Addr-S parameter identifies a starting address in memory and the Addr-E parameter identifies an ending address within the total address space that is defined within the device. The range of addresses represented by Addr-S to Addr-E is the region of this address space that is to be initialized for use by an application that is running on the host processor(s), e.g. a database application program. In response, the data storage system sets one or more bit maps for all of the blocks within address space that was defined for the particular device.

Note that it is possible that the application will send multiple F_init commands to the data storage system, for example, if it wants to initialize regions of the device address space that are not contiguous.

Once all of the regions are defined, the application sends the F_init_close[handle] command. This command, which supplies the handle for the device, is used after all of the regions of address space that are to be initialized on demand are identified. It serves to invalidate the handle and to indicate that the initialization process has been completed.

Figure 2:
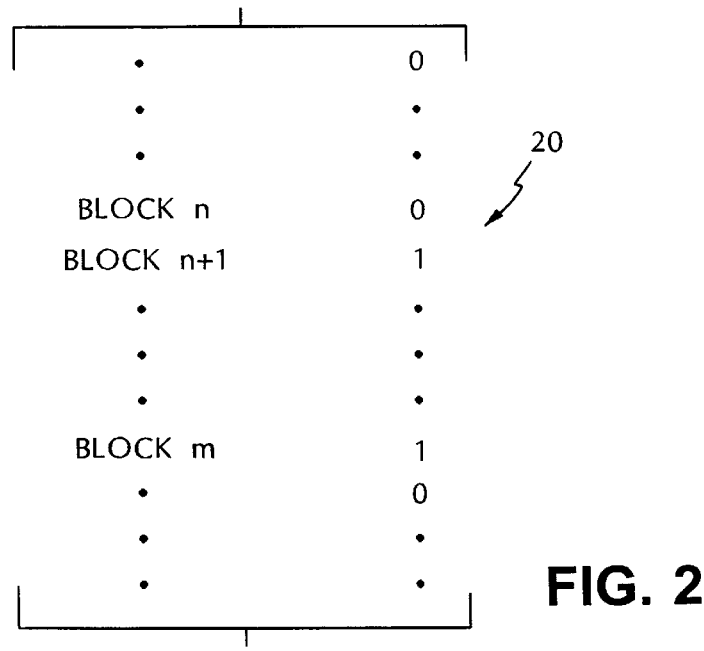
FIG. 2 is an example of a bit map that is used to implement the on-demand initialization command.
Figure 3:
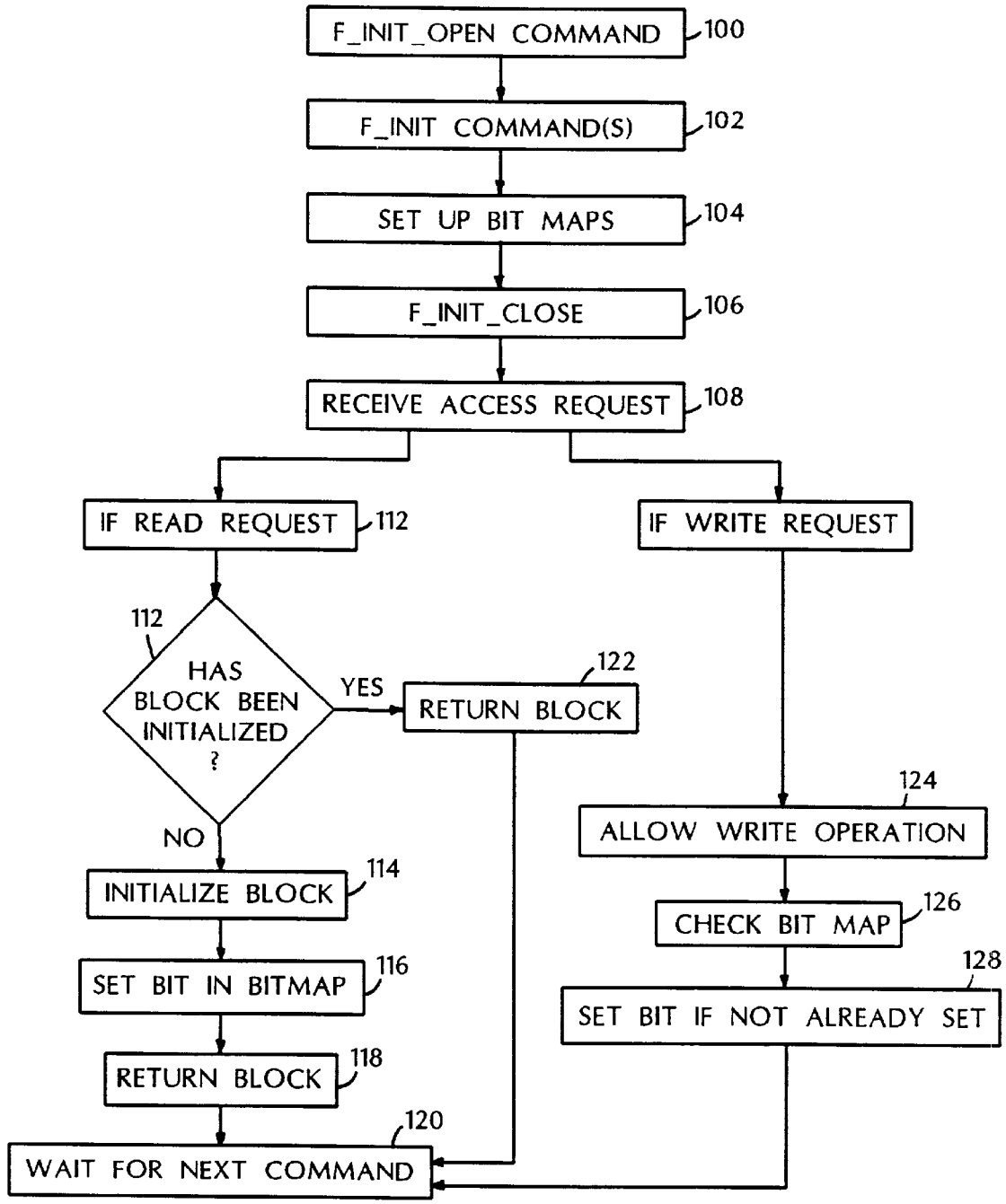
FIG. 3 is a flow chart of the on-demand initialization procedure.

The sequence of steps that are involved in using the on demand initialization command are shown in FIG. 3. First, the application running on host processor 4 creates a device or region of its address space on which a database or multiple databases are to be stored and it issues the F_init_open[] command to start the initialization procedure and to pass certain relevant parameters (as described above) to the data storage system (step 100). Then, the application issues one or more F_init[ ] commands specifying the address ranges which define the device or address region that is to be used for the database (step 102). In response to receiving the F_init[ ] command, the data storage system sets up a bit map 20 (see FIG. 2) for all of the blocks that are within the specified region of storage address space (step 104). The bit map might be stored in cache memory or other local memory. Each block is represented in the bit map by an entry that can have one of two values, namely, set or cleared (e.g. 1 or 0). A value of zero signifies that the corresponding block has not yet been initialized; and conversely, a value of one signifies that the corresponding block has been initialized. When the bit map is first set up in response to the F_init[ ] command, all of its entries are initialized to zero.

Once all of the address regions have been identified to the data storage system, the application sends the F_init_close[ ] command to the data storage system to notify it that the initialization procedure has completed (step 106).

Then, each time the data database application requests an access of a location within the address space, the controller responds differently depending on whether the request is a request for a read operation or a request for a write operation (step 108). If the request is for a read operation, the controller first checks the bit map before permitting the access to occur (step 112). If the read request is seeking access to a location that has not yet been initialized (i.e., relevant bit is set to zero), the controller initializes the relevant block(s) (step 114); sets the relevant bit(s) to one (step 116) and then returns the block(s) (step 118). It then waits for the next command from the host processor (step 120) and loops back to step 108, if either a read request or a write request is received.

In step 112, if the bit map shows that the relevant region of storage had previously been initialized, then the controller returns the block(s) immediately (step 122).

If the database application requests a write operation to a location within the address space, there is no need to initialize the relevant block(s) since whatever is stored there will be overwritten by the data that the database application is intending to write to them. In other words, the controller allows the write operation to take place (step 124). However, the data storage system also checks the bit map to determine whether that region of memory had been previously initialized (step 126). If it has not been previously initialized, after the write operation, the controller writes a one to the bit map to indicate that it has now been initialized (step 128). This prevents any subsequent read operation of that location from causing an initialization of the block(s) and resulting destruction of the data that was put there by the write operation.

In summary, the controller keeps track of the blocks and only initializes blocks just before they are going to be read for the first time. In other words, the initialization is performed by the data storage system automatically and on the fly (i.e., incrementally). The next time that the same block is accessed, for whatever reason, the controller will detect that it has already been initialized and will thus perform no further initialization.

Other embodiments of the invention are within the following claims. For example, in the embodiment described above, the minimum size of the block that is initialized before a read takes place is determined and specified by the application. However, it is also possible to set the size of the region that is to be initialized to be a larger value. In the case that data is staged to cache memory in 32 Kbyte blocks, the controller could use a granularity equal to a block size of 32 Kbytes. Thus, the bit map would have an entry for each 32 Kbyte block. Also, one could initialize the entire 32 Kbyte block of data after it is moved into cache memory if it has not been previously been initialized and before any access to it is permitted.

What is claimed is:

1. An on-demand method of initializing a data storage medium, said method comprising:

specifying a region of the data storage medium that is to be initialized in preparation for storing application data in that region;

storing a predetermined string of bits to be used for initializing the region of the data storage medium;

setting up a table for keeping track of which portions of the region have been initialized; in response to receiving each read request that identifies a specified location within the region, (a) checking the table to determine whether the specified location had been previously initialized;

(b) if the table indicates that the specified location has not been previously initialized, initializing that specified location within the data storage medium by writing said predetermined string of bits to the specified location; and (c) in addition to initializing the specified location, updating the table to indicate that the specified location within the data storage medium has been initialized.

2. The method of claim 1 further comprising: (d) after initializing the specified location, performing a read operation in fulfillment of the read request.

3. The method of claim 2 further comprising:

(e) if the table indicates that the specified location has been previously initialized, performing the read operation without performing any further initialization of the specified location.

4. The method of claim 1 wherein said predetermined string is all zeros.

5. A method implemented within a data storage system to which a host processor is connected for initializing on demand a storage medium within the data storage system, said method comprising:

receiving an initialization command from the host processor;

in response to receiving the initialization command, setting up a table containing a plurality of records for a corresponding plurality of blocks in the storage medium, each of said plurality of records storing an entry that equals a first value;

storing an initialization value to be used for initializing the data storage medium;

receiving read commands from the host processor, said read commands identifying a region of the storage medium to which a read access is being requested, said identified region encompassing at least one block among said plurality of blocks; and in response to receiving each read command, (a) determining whether the entry in a record in the table corresponding to said one block equals the first value;

(b) if the entry in the corresponding record equals the first value, writing said initialization value into said one block in the data storage medium;

(c) in addition to writing said initialization value into said one block, setting the entry in the corresponding record for that block to a second value; and (d) performing the access requested by the access command.

6. The method of claim 5 wherein the initialization command is a sequence of multiple commands.

7. The method of claim 5 wherein the initialization command also passes said initialization value to the data storage system.

8. A data storage system that provides data storage for a host processor, the data storage system comprising:

a data storage medium; and a controller programmed to carry out the following steps:

in response to receiving an on-demand initialization command specifying a region of the data storage medium that is to be initialized in preparation for the host processor storing application data in that region, setting up a table for keeping track of which portions of the region have been initialized;

storing a predetermined string of bits to be used for initializing the region of the data storage medium; and in response to receiving each of a plurality of read requests from the host processor, each read request for reading a corresponding specified location within the region, (a) checking the table to determine whether the corresponding specified location has been previously initialized;

(b) if the table indicates that the corresponding specified location has not been previously initialized, initializing that corresponding specified location within the data storage medium by writing said predetermined string of bits to the corresponding specified location; and (c) in addition to initializing that specified location, updating the table to indicate that the corresponding specified location within the data storage medium has been initialized.

* * * * *